Oct. 11, 1955     W. H. DEUSER     2,720,622
REGULATED LOW VOLTAGE POWER SUPPLY
Filed Nov. 26, 1952
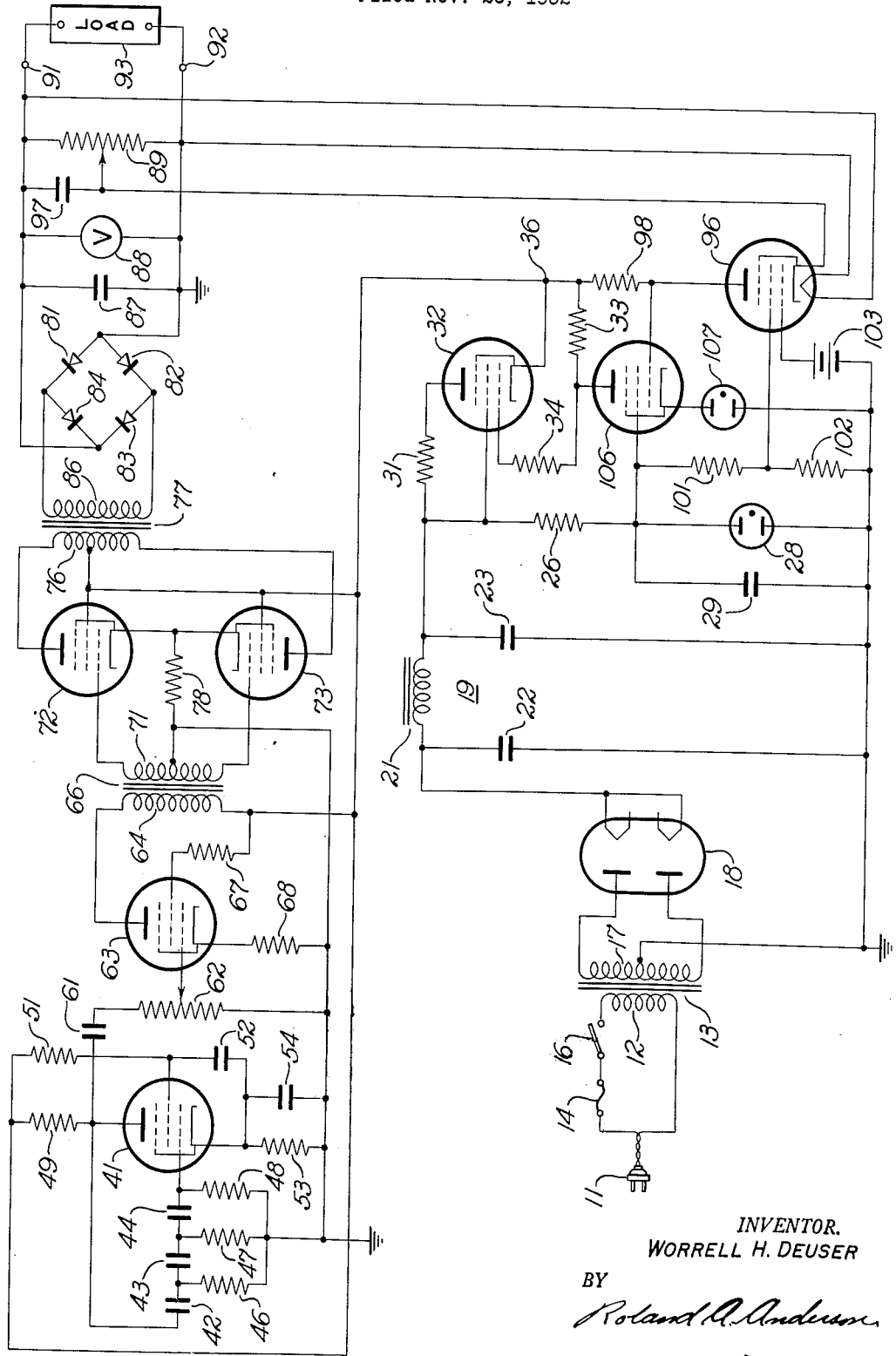
INVENTOR.
WORRELL H. DEUSER
BY
*Roland A. Anderson*
ATTORNEY.

United States Patent Office 2,720,622
Patented Oct. 11, 1955

2,720,622

REGULATED LOW VOLTAGE POWER SUPPLY

Worrell H. Deuser, El Cerrito, Calif., assignor to the United States of America as represented by the United States Atomic Energy Commission Application November 26, 1952, Serial No. 322,677

4 Claims. (Cl. 321—19)

The present invention relates to a power supply of a unidirectional voltage and, more particularly, to a regulated low voltage power supply having a substantially zero ripple component in the output voltage thereof.

With improvements in devices, such as the mass spectrograph and electron microscope, which increase the sensitivity thereof so that much improved results are obtainable, it has been found that available low voltage power supplies are severely limiting. The present invention has been found to overcome the limiting features of presently available low voltage power supplies by providing an extremely well regulated output voltage which is substantially free of ripple voltage.

It is therefore an object of the present invention to provide a new and improved regulated low voltage power supply.

Another object of the invention is to provide a regulated low voltage power supply having a plurality of regulating actions which operate to maintain the output voltage extremely stable.

Still another object of the invention is to provide a regulated low voltage power supply, the output of which is derived from full-wave rectification of an alternating voltage of substantially 1000 cycles per second.

A further object of the invention is to provide a regulated low voltage power supply wherein stable operation is obtained by applying the regulated output voltage as the heater voltage of a regulating tube and a portion of such output voltage as cathode bias to be balanced against a standard grid bias of such tube.

Further objects and advantages of the present invention will be apparent in the following description and claims considered together with the accompanying drawing which is a schematic wiring diagram of the invention.

Referring to the drawing in detail, there is provided a plug 11 adapted to be connected into a source of commercial power (not shown). One terminal of the plug 11 is connected to one side of a winding 12 of a transformer 13 through a series-connected fuse 14 and single pole single throw switch 16 and the other terminal of the plug is connected directly to the other side of such winding. The second winding 17 of the transformer 13 has a center tap which is grounded and end leads which are connected to separate anodes of a double diode rectifier tube 18. The two cathodes of the tube 18 are connected together and serve as the positive side of a full-wave rectified voltage with the center tap of the transformer winding 17 serving as the negative side of such rectified voltage. It may be necessary to use more than one rectifier tube connected in parallel to suitably handle the current load of the circuit; however, for convenience only one such tube 18 is shown.

To smooth the unidirectional voltage appearing between the cathodes of the tube 18 and the center tap of the transformer winding 17, there is provided a filter circuit 19 comprising an inductance 21 connected serially to the cathodes and two capacitors 22 and 23 connected, respectively, between either end of the inductance and the center tap. A voltage divider comprising a series-connected resistor 26, and voltage regulator diode type tube 28 is connected across the output of the filter. A by-pass capacitor 29 is connected in parallel with the regulator tube 28 to ground alternating components of voltage. The junction between the resistor 26 of the voltage divider and the filter circuit 19 is connected through a dropping resistor 31 to the anode of a pentode type tube 32, and directly to the screen grid of such tube. The suppressor grid of the tube 32 is directly connected to the cathode which serves as the positive terminal 36 of a regulated unidirectional voltage which is utilized to furnish operating potentials to other components of the circuit. Also, the cathode of the tube 32 is connected to the control grid through two series-connected resistors 33 and 34. It is to be noted that three or four tubes connected in parallel may be required to safely carry the current load of the tube 32 which for convenience has been illustrated as a single tube.

A conventional phase-shift oscillator is provided to furnish an alternating voltage, which in the present embodiment has a frequency of 1000 cycles per second, although not limited to such frequency. Such oscillator is constructed about a pentode type tube 41 having three similar and series-connected capacitors 42, 43, and 44 coupling the anode to the control grid with three separate and similar resistors 46, 47, and 48 connected, respectively, from the junction between the capacitors and also from the control grid to ground. Each of such capacitor-resistor combination is designed to shift the phase of anode voltages by 60 degrees so that the control grid is impressed with voltages 180 degrees out of phase with such anode voltages. As stated previously, operating voltage for the tube 41 is obtained from the positive terminal 36 by connecting a dropping resistor 49 therebetween. The screen grid of the tube is connected to the terminal 36 through a resistor 51 and to the cathode through a radio-frequency by-pass capacitor 52 while the cathode is directly connected to the suppressor grid and also to ground through a parallel-connected cathode resistor 53 and by-pass capacitor 54.

To couple the output of the oscillator circuit to a driver amplifier, a coupling capacitor 61 is connected to one end of a potentiometer 62, the other end of which is connected to ground. The adjustable arm of the potentiometer 62 is directly connected to the control grid of an amplifier type tube 63. One end of one winding 64 of a coupling transformer 66 is directly connected to the anode of the tube 63 while the other end is directly connected to the positive terminal 36 and to the screen grid of the tube through a resistor 67. To complete the connections of the tube 63, the cathode thereof is directly connected to the suppressor grid and to ground through a cathode resistor 68.

The second winding 71 of the transformer 66 is center-tapped and the center tap is directly connected to ground. A pair of power amplifier pentode tubes 72 and 73 are connected in push-pull by, respectively, connecting the control grids thereof to the end leads of the winding 71 of the coupling transformer 66. One winding 76 of a second coupling transformer 77 is connected between the anodes of the two power tubes 72 and 73 with a center tap of such winding connected to the terminal 36. The cathodes of the two tubes 72 and 73 are connected to the suppressor grids thereof and, in turn, through a single resistor 78 to ground. To complete the connections of the two tubes 72 and 73, the screen grids thereof are directly connected to the positive terminal 36.

A bridge-rectifier circuit utilizing four series-connected unidirectional devices 81, 82, 83, and 84, illustrated as selenium rectifiers, in a closed circuit is, respectively, connected with opposite junctions thereof joined to the end leads of the second winding 86 of the second coupling transformer 77. The other junctions of the bridge-rectifier are, respectively, connected to either side of a smoothing capacitor 87, to either side of a voltmeter 88, to either side of potentiometer 89, and finally to output terminals 91 and 92 the latter of which is grounded. The output terminals 91 and 92 serve as connections between which a load 93 may be connected.

To regulate the voltage appearing between the output terminals 91 and 92, the adjustable arm of the potentiometer 89 is connected to the cathode of a regulating pentode type tube 96 and to the terminal 91 through a by-pass capacitor 97. Also, the filament of the tube 96 is connected between the two output terminals 91 and 92 so that the cathode heating is derived from the regulated output voltage to minimize variations in the emissibility of the cathode. A dropping resistor 98 is connected between the positive terminal 36 and the anode of the regulating tube 96 so that an operating voltage is impressed. A voltage divider comprising two series-connected resistors 101 and 102 is connected across the voltage regulator tube 28, and the junction between such resistors is connected to the screen grid of the tube 96. Further operating connections of the tube 96 are a connection from the cathode to the suppressor grid and a connection from the control grid to the positive terminal of a source 103 of standard voltage (illustrated as a battery), the negative terminal of which is connected to ground.

To couple variations in voltage at the anode of the regulating tube 96 to the control grid of the pentode tube 32, which is connected in series between the filter circuit 19 and the positive terminal 36, there is provided an inverter tube 106 having the control grid thereof directly connected to the anode of the regulating tube and the anode thereof directly connected to the junction between the two resistors 33 and 34 in the control grid circuit of the series tube 32. Further connections of the inverter tube 106 are made from the cathode to the suppressor grid and to ground through a second voltage regulator diode type tube 107 as well as from the screen grid to the junction between the resistor 26 and regulating diode 28 of the voltage divider.

With the plug 11 connected to a suitable source of commercial power and the switch 16 closed, a filtered unidirectional voltage appears across the voltage divider comprising the resistor 26 and the voltage regulator tube 28. The foregoing impresses a voltage across the combination of the series regulator tube 32 and oscillator tube 41 such that the oscillator circuit is operable to generate an alternating voltage, of substantially 1000 cycles per second in the present embodiment. The operation of the phase-shift oscillator is conventional and well known in the electronic art so that a detailed description will not be given.

The alternating voltage appearing at the anode of the oscillator tube 41 is coupled to the driver amplifier tube 63 in a conventional manner, and the potentiometer 62 may be adjusted to control the amplitude of such alternating voltage at the control grid of the tube 63. The output of the driver amplifier tube 63 is transformer coupled to the two tubes 72 and 73 which are interconnected in a conventional push-pull power amplifier circuit. Transformer coupling is again employed to impress the alternating output voltage of the two push-pull amplifier tubes 72 and 73 across the bridge rectifier circuit comprising four unidirectional devices 81—84 so that a full-wave rectified voltage appears between the output terminals 91 and 92.

With the connections as described, it is seen that two steps have already been taken toward minimizing ripple components of voltage in the voltage across the terminals 91 and 92. Such steps are characterized by the full-wave rectification of the alternating voltage (1000 cycles per second) and the smoothing effect of the shunt capacitor 87 which has a substantially large value of capacitance so as to resist changes in voltage and thereby further minimize ripple voltages.

Further regulation and ripple voltage suppression are effected by connecting a portion of the voltage across the output terminals 91 and 92 to the cathode of regulating tube 96 and by utilizing the output voltage as the filament voltage of such tube. The cathode bias of the tube 96 is effective to control the operation of the tube which has a normal positive bias impressed on the control grid because of the standard voltage source 103. Voltage variations at the anode of the regulating tube 96 are connected to the control grid of the tube 106 and thereby control conduction of such tube. Since a grid current limiting resistor is connected between the anode of the tube 106 and the control grid of the series regulating tube 32, conduction of the latter is controlled by that of the former. The net effect of such operation is to control the amplitude of the alternating voltage developed by the oscillator tube 41. The regulation described in the foregoing is a positive regulation so that a change in the output voltage at the terminals 91 and 92 results in a change in the amplitude of the alternating voltage of the oscillator to resist the original change.

It is also to be noted that the anode of the regulating tube 96 is connected to the positive terminal 36 through a dropping resistor 98 and such connection results, when other factors are constant, in regulation of the voltage at the terminal 36. Again the regulation is such that changes are overcome to maintain a constant voltage.

Now with the circuit in operation, a decrease in voltage at the positive terminal 36 results in a decrease in the anode voltage of the regulating tube 96 which is impressed upon the control grid of the tube 106. Such decrease in voltage at the control grid of the tube 106 results in less current flow through the tube so that the anode voltage increases (less potential drop across the resistor 33) to render the control grid of the series tube 32 more positive. The latter action increases the flow of current through the tube 32 and thereby overcomes the original decrease in voltage at the terminal 36. Similar operation occurs when there is a voltage increase at the terminal 36 to decrease the current flow of the tube 32 and overcome the original voltage increase. Thus, there is a stable and well-regulated voltage available between the terminal 36 and ground to operate the remainder of the circuit.

When the voltage between the output terminals 91 and 92 decreases, a portion of such voltage decrease is impressed from the adjustable arm of the potentiometer 89 upon the cathode of the regulating tube 96. The control grid of such tube 96 is biased positively by the source 103 of standard voltage so that a decrease in voltage at the cathode results in a greater grid to cathode potential difference and, therefore, a greater conductivity of the tube. Increased current flow through the tube 96 causes a greater voltage drop across the dropping resistor 98 and therefore a decrease in the grid bias of the tube 106. Such decrease in grid bias results in less current flow in the tube 106 and so a more positive voltage is impressed on the control grid of the series regulating tube 32 which causes the tube to conduct more heavily and increase the voltage applied to the oscillator from the terminal 36. An increase in the operating voltage of the oscillator tube 41 increases the value of the alternating voltage at the output thereof which, in turn, increases the voltage appearing between the output terminals 91 and 92 to overcome the original decrease.

The potentiometer 62 connected in the control grid circuit of the driver amplifier tube 63 provides a means for adjusting the value of output voltage between the terminals 91 and 92. When an adjustment is made with the potentiometer 62, it is then necessary to make an adjustment in the position of the variable arm of the potentiometer 89 so that the proper relation between the control grid and cathode voltages of the tube 96 is maintained.

Thus, there is provided a regulated low voltage power supply which is controlled by a plurality of separate regulating actions which cooperate to maintain the output voltage at a desired level and substantially free of ripple components of voltage. Such regulating actions are in addition to the inherently stable characteristics of full-wave rectification of an alternating voltage, having a frequency of substantially 1000 cycles per second, with a smoothing capacitor connected thereacross.

While the salient features of the present invention have been described with respect to one embodiment it will, of course, be apparent that numerous modifications may be made within the spirit and scope of the invention, and it is therefore not desired to limit the invention to the exact details shown except insofar as they may be defined in the following claims.

What is claimed is:

1. In a regulated low voltage power supply, the combination comprising a source of voltage having a positive and negative terminal; a series tube having at least an anode, cathode, and control grid with the anode thereof connected to the positive terminal of said source; an oscillator circuit having an output and a power input with the latter connected between the cathode of said series tube and the negative side terminal of said source; a full-wave rectifier coupled across the output of said oscillator; a load having terminals respectively connected to said rectifier; a regulating tube having at least a filament, cathode, control grid, and anode with the anode connected to the cathode of said series tube, the filament connected in parallel with said load, the cathode connected to an adjustable tap of a resistor connected in parallel with said load, positive bias means connected to the control grid of said regulating tube; and inverting means connected between the anode of said regulating tube and the control grid of said series tube.

2. In a regulated low voltage power supply, the combination comprising a source of voltage having a positive and a negative terminal; a series tube having at least a cathode, control grid, and cathode with the anode thereof connected to the positive terminal of said source; an oscillator circuit having an output and a power input with the latter connected between the cathode of said series tube and the negative terminal of said source to receive operating voltage therefrom; a driver amplifier having an input and an output with the former connected across the output of said oscillator; a push-pull amplifier having an input and an output with the former coupled to the output of said driver amplifier; a full-wave rectifier having an input and an output with the former connected across the output of said push-pull amplifier; a potentiometer and a load connected in parallel across the output of said rectifier; a regulating tube having at least a filament, cathode, control grid, and anode with the anode thereof connected to the cathode of said series tube through a resistor, the filament connected in parallel with said load, the cathode connected to an adjustable arm of said potentiometer, a source of standard positive voltage connected to the control grid of said regulating tube; and inverting means connected between the anode of said regulating tube and the control grid of said series tube.

3. In a regulated low voltage power supply, the combination comprising a source of voltage having a positive and a negative terminal; a series tube having at least a cathode, control grid, and anode with the anode thereof connected to the positive terminal of said source; an oscillator circuit having an output and a power input with the latter connected between the cathode of said series tube and the negative terminal of said source whereby operating potentials are impressed on said oscillator; a driver amplifier having an input and an output; adjustable means connected between the output of said oscillator and the input of said driver amplifier for altering the amplitude of the impressed voltage; a push-pull amplifier having an input and an output with the former inductively coupled to the output of said driver amplifier; a bridge rectifier circuit connected across the output of said push-pull amplifier; a parallel combination of a potentiometer, a smoothing capacity, and a load connected across the output of said rectifier circuit; a regulating tube having at least a filament, cathode, control grid, and anode with the anode thereof connected to the cathode of said series tube through a dropping resistor, the filament connected in parallel with said load, the cathode connected to an adjustable arm of said potentiometer, a source of standard positive voltage connected to the control grid of said regulating tube; and inverting means connected between the anode of said regulating tube and the control grid of said series tube.

4. In a regulated low voltage power supply, the combination comprising a source of unidirectional voltage having a positive and a negative terminal; a series tube having at least a cathode, control grid, and anode with the anode thereof connected to the positive terminal of said source; an oscillator having an output and a power input with the latter connected between the cathode of said series tube and the negative terminal of said source; a full-wave rectifier having an input and an output with the former coupled across the output of said oscillator; a potentiometer and a load connected in parallel across the output of said rectifier; a regulating tube having at least a filament, cathode, control grid, and anode with the anode connected to the cathode of said series tube, the filament connected in parallel with said load, the cathode connected to an adjustable element of said potentiometer, the control grid connected to a source of positive bias voltage; and an amplifier tube having at least a cathode, control grid, and anode with the anode connected to the positive terminal of said source and to the control grid of said series tube, the cathode coupled to the negative side of said source, the control grid connected to the anode of said regulating tube.

References Cited in the file of this patent

UNITED STATES PATENTS

| | | |
|---|---|---|
| 2,451,021 | Detund | Oct. 12, 1948 |
| 2,459,822 | Lalande | Jan. 25, 1949 |